United States Patent [19]

Holloran et al.

[11] Patent Number: 5,369,573
[45] Date of Patent: Nov. 29, 1994

[54] STRUCTURED DOCUMENT SYNTAX MANAGEMENT

[75] Inventors: Robert W. Holloran, Kirkland; Ryan P. Kelley, Seattle, both of Wash.

[73] Assignee: Docustructure Corporation, Kirkland, Wash.

[21] Appl. No.: 908,706

[22] Filed: Jul. 2, 1992

[51] Int. Cl.⁵ ............................................. G06F 15/38
[52] U.S. Cl. .......................... 364/419.07; 364/419.08
[58] Field of Search ............... 364/419, 419.04, 419.07, 364/419.08, 419.01

[56] References Cited

U.S. PATENT DOCUMENTS

| | | | |
|---|---|---|---|
| 4,384,329 | 5/1983 | Rosenbaum et al. | 364/300 |
| 4,887,212 | 12/1989 | Zamora et al. | |
| 5,099,425 | 3/1992 | Kanno et al. | 364/419 |
| 5,101,349 | 3/1992 | Tokuume et al. | |

OTHER PUBLICATIONS

R. Norman, R. Holloran, *How to Simplify the Structure of Administrative Procedures to Make them Easier to Write, Review, and Use;* IPCC 1991 Conf. Record, pp. 447–450.

S. Luna, M. Sturdivant, R. McKay, *Factoring Humans into Procedures,* 1988 IEEE Conference on Human Factors and Powerplants, 1988.

G. Alexander, M. Walter, *SGML '90: A New Breed of Users Step Forward;* Seybold Report on Publishing Systems, vol. 20, No. 7, Dec. 24, 1990.

R. Norman, R. Holloran, *A System for Writing Administrative Procedures,* Publication Unknown, 1988.

R. Holloran, R. Norman, R. Kelley, *Incorporating Electronic Writer's Guide in the Procedure Writer–Computer Interface,* Publication and date unknown.

*Primary Examiner*—Roy N. Envall, Jr.
*Assistant Examiner*—Ari M. Bai
*Attorney, Agent, or Firm*—Graybeal Jackson Haley & Johnson

[57] ABSTRACT

A structured document system for generating, from a single set of parts of speech entered into a computer, alternative forms of documents with different formats and syntaxes using the same set of parts of speech. For each set of parts of speech, a record is created which includes alternative forms of the verb, alternative forms of any product contained in the sentence, and a statement of the requirement level as mandatory, recommended, or optional. A document is defined by specifying step levels and, for each step level, a set of parts of speech. For each alternative document to be produced, a complete syntax is specified which includes a concatenation rule for each step level. When the document is generated according to the specified syntax, concatenation rules determine the format and structure of each heading or action step.

8 Claims, 4 Drawing Sheets

STRUCTURED DOCUMENT SYNTAX MANAGEMENT

BACKGROUND OF THE INVENTION

The invention relates generally to structured document generation software applications. More particularly, it relates to improvements in syntax generation and management of structured document objects.

Structured documents are those whose content, format and syntax must follow certain required guidelines set forth, for example, by government entities, like the Department of Energy (DOE), or a corporation, like the Boeing Company. The DOE, for example may have several different styles of documents with similar and disparate rules for how those documents they should appear and what their content should be, ranging, for example, from policy oriented documents to nuclear power plant maintenance documents.

Numerous document creation and management systems have been developed with widely varying levels of sophistication. It is desireable to use structured document systems in those situations where it is imperative to provide the writer relief from the burden of constantly referring to a source document for formatting rules (arrangement of objects in a document and their appearance) or to a grammar reference for proper syntax (generically the arrangement of objects, such as words, in a sentence and the proper form of those words).

A common necessity for writers of technical manuals, for example, is the selection of proper verb forms when changing the tense of a sentence or changing the use of the sentence content from a descriptive form to an active form. For example, consider the following heading that might appear in a document relating to bicycle maintenance, "Removing Grease from the Bearing." Below this heading may be an action sentence which reads, "The mechanic may remove grease from the bearing by soaking it in solvent." In this example, the heading and the action sentence use two different forms of the same verb, "remove". It is preferable for the writer to not have to be concerned with which syntax rules to apply to yield the proper verb form, as for a heading or an action sentence, when specifying the use of the grammatical elements of the sentence: actor, verb, direct object, etc.

Structured documents are often created by selecting portions of other documents with "cut and paste" technology. Other approaches include the "hot link" or "publish and subscribe" features of some of the advanced word processing systems wherein a document deriving some of its content from an initial document will have that derived content changed or updated if it is altered in the initial document. Still other methods utilize traditional report generation capabilities of database management software capable of storing and reporting sentences and paragraphs. Also, powerful outlining software, such as "MORE", is used to provide a desired overall structure of the document, but the writer must still be concerned about the format and syntax at the sentence level. No known structured document system permits generation of documents from a list of steps containing the generic content of each step to which can be applied predefined syntax and format requirements for that specific document. Such an approach would provide flexibility in the use of a single set of content paragraphs to create numerous documents with different defined structures, relieving the writer from the burden of implementing syntax and format rules when generating each document and making storage of the documents more compact.

SUMMARY OF THE INVENTION

The invention is a method and a software implemented device for generating and maintaining syntax sensitive structured documents. It can be implemented by developing a software application in any of a variety of programming languages. The detailed description includes an implementation accomplished by using the database developers' tool "Fourth Dimension".

The application is built around a central file called a step data table. Each record, or step, in the step data table comprises fields, or elements, which contain textual or graphical content. The steps are independent of the syntax or format rules that will be used to concatenate the content of a step into the form and style desired.

A document may be created by selecting a series of step ID numbers, which point to records in the step data table, and specifying the use of each step as a heading or an action step. Also, a syntax which comprises a set of concatenation rules to be applied to each type of step is specified for the document. Depending on the level of heading or action step specified, a particular concatenation rule embodied in the syntax is applied to that step. A significant advantage of the application is that once a document is created, it can easily be converted to a different purpose by specifying that a different syntax be applied to the selected steps.

DETAILED DESCRIPTION OF A PREFERRED EMBODIMENT

Figure 1:
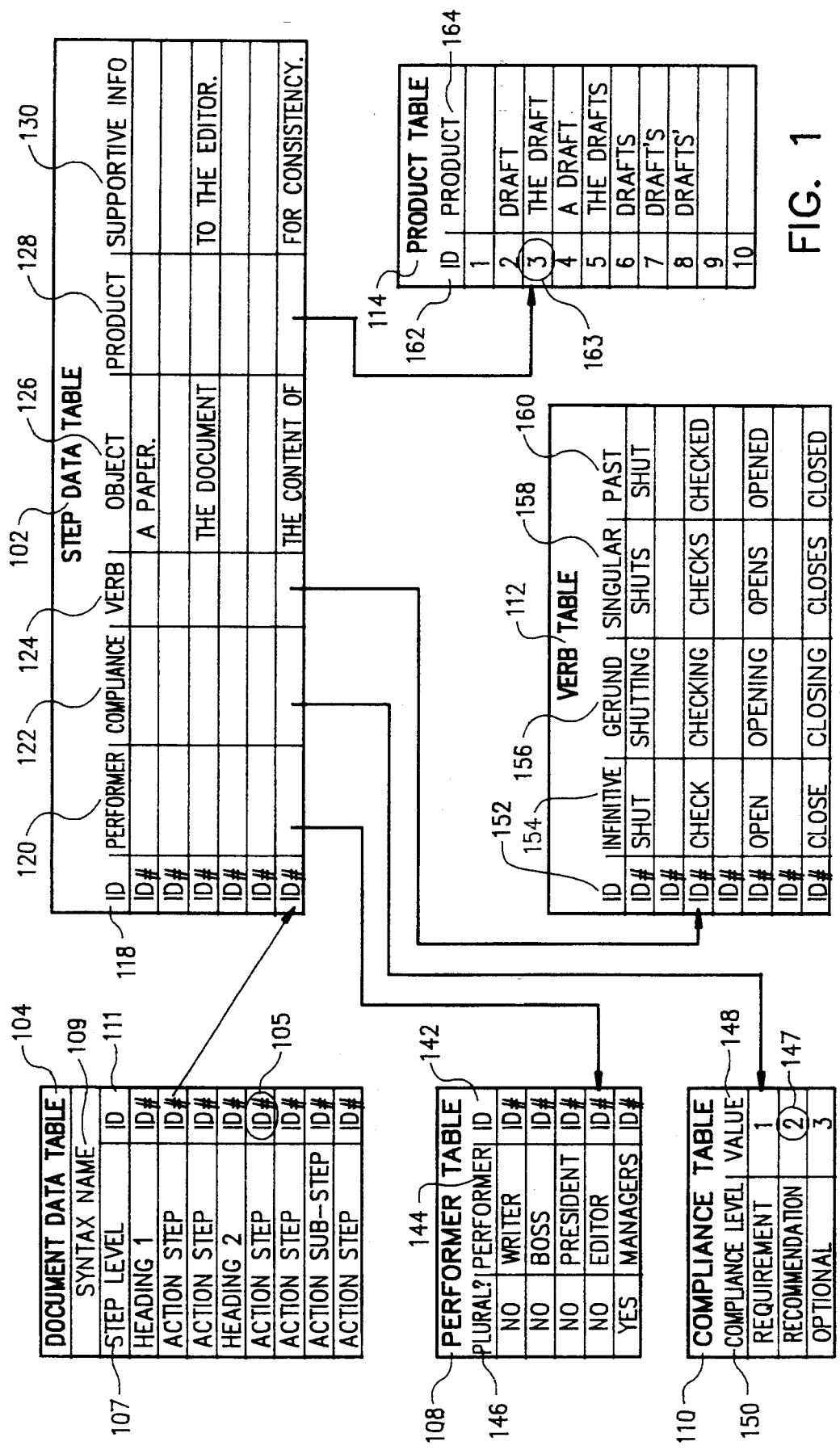
FIG. 1 shows the data structures for all of the data necessary to create a particular document.
Figure 2:
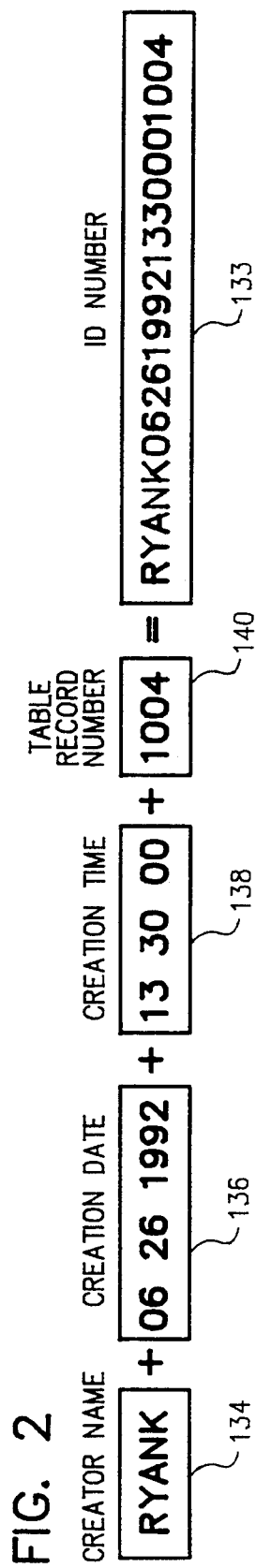
FIG. 2 shows the structure of the standard identification number which is used to create the pointer relationship between various tables in FIG. 1.

The structured document system is shown in FIG. 1. The application comprises the following data structures: step data table 102, document data table 104, performer table 108, compliance table 110, verb table 112, and product table 114. Step data table 102 is comprised of a plurality of records, each beginning with a unique ID number field 118 followed by performer ID field 120, compliance value field 122, verb ID field 124, object field 126, product value field 128, and supportive information field 130. Referring now to FIG. 2, unique ID number 133 is a concatenation of 23 alphanumeric characters comprising 4 elements: a unique five-character creator name element 134, an eight-character creation date element 136, a six-character creation time element 138, and a four-character table record number element 140. ID number 133's formulation is standard for the application and is used in several tables described herein.

Referring back to FIG. 1, performer field 120 contains an ID number 142 according to the standard format 133 which points to a record in performer table 108.

Compliance value field 122 is an integer field where the value of the integer is defined by prompting the user to choose a "compliance level". Compliance level refers to the permissiveness of the action to be taken in the step in question. For example, "REQUIREMENT" (shall) is represented by an integer value of "1", "RECOMMENDATION" (should) is represented by an integer value of "2", and "OPTIONAL" (may) is represented by an integer value of "3". The integer in the compliance value field 122 points to a record in compliance table 110.

Verb field 124 contains an ID number 152 according to the standard format 133 which points to a record in verb table 112. The entry of a verb form itself is discussed below.

Object field 126 is an 80 character text field in which the direct object of the preceding verb element is entered. For example, in the phrase "create the document", "the document" is the direct object.

Product field 128 is an integer field which is comparable to the compliance field 122 mentioned above. The integer value points to a specific record in product table 114. Each product in the product table is a noun. A product can be used, for example, as a direct object or as part of a prepositional phrase. The various forms of each product, such as singular and plural possessive and use with definite and indefinite articles, are stored in product table 114 and pointed to by the integer value in product field 128.

Supportive information field 130 is a text field of variable length. The content of this field may used for prepositional phrases, dependent/independent clauses, and final punctuation e.g., ".", ":", ";", ",").

Performer table 108 contains three fields. The first field is performer ID field 142 which is followed by performer lookup field 144 and plural true/false field 146. Each record of performer ID field 142 contains an ID number in the standard format 133 that uniquely identifies each performer table 108 record. Performer lookup field 144 is an 80 character text field in which is entered an approved performer (e.g., manager, director, mechanic, supervisor, etc.). Plural true/false field 146 contains one value if the performer is plural or a second value if the performer is singular.

Compliance table 110 contains two fields. The first field is compliance lookup value field 148 which contains an integer record ID number. The second field is compliance level field 150 which contains one word (e.g., .. "shall", "should", "may") to describe the level of permissiveness discussed above.

Verb table 112 contains five fields. The first field is the verb lookup ID field 152 which contains an ID number in the standard format 133 identifying a record in verb table 112. The second field is the verb infinitive field 154 which is a 20 character text field in which is entered the infinitive form of a desired verb. The third field is the verb gerund field 156 in which the gerund form of the verb is entered. The fourth field is the third-person singular verb field 158 in which is entered the third-person singular form of the desired verb. The fifth field is the verb past tense field 160 in which is entered the past tense form of the desired verb.

Product table 114 contains two fields. The first field is the product lookup value field 162 in which is stored an integer record ID number. The second field is the product field 164 which is an 80 character text field. A noun which is defined as a product (see discussion above) is entered in this field. The product field 164 of each record in product table 114 contains different forms of the same noun, such as the following: car, cars, a car, the car, car's and cars'.

Step Table User Interface

Figure 3:
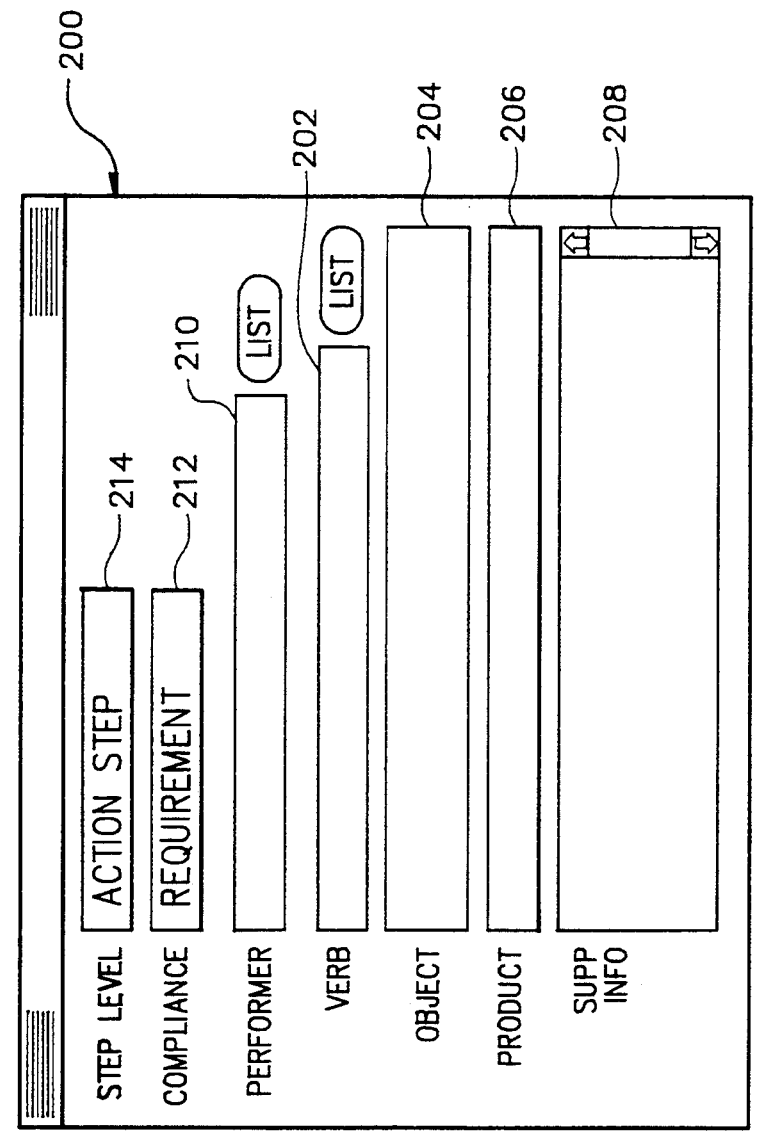
FIG. 3 shows the input screen presented to the user for entering information required to create a step.

Referring now to FIG. 3, the user of the structured document application will add records to step data table 102 via step entry screen 200. The user may enter data into the above described fields in any order he wishes. By way of illustration, entry of data and operations required to generate data for a step data table 102 record are described below for the following sample step:

The Editor shall check the content of the draft for consistency.

To begin, the user will execute a "new step" command via a menu. A new record will automatically be created in step data table 102 and a new ID number 133 (Ref. FIG.2) will be entered in the step ID field 118 (Ref. FIG. 1). The user will be presented with step entry screen 200. The user will then complete the step data table 102 fields described above via their respective entry areas in screen 200 as follows:

| Text | Entry Area | Ref. Numeral |
| --- | --- | --- |
| check | Verb | 202 |
| the content of | Object | 204 |
| the draft | Product | 206 |
| for consistency | Supp Info | 208 |
| Editor | Performer | 210 |
| Requirement | Compliance | 212 |

Figures 4, 6:
FIG. 4 shows the user entry screen for entering the forms of a verb.
FIG. 6 shows the syntax table which lists the possible syntaxes which may be chosen for a document and, for each of these syntaxes, the particular concatenation rules that would be applied for each heading and each step.

The user completes verb entry area 202 by typing in the infinitive form of the verb "check." The application then searches the verb infinitive field 154 of verb table 112 to determine if the verb "check" already exists. If the verb "check" does exist, the application permits the user to proceed to the next entry area. If the verb "check" does not exist, the user is prompted to enter the gerund, third-person singular, and past tense forms of the verb "check" in a verb form dialog box 400 as shown in FIG. 4. When the user completes the verb form dialog box 400, the application creates a new record in verb table 112, assigns a new ID number 133 into verb lookup ID field 152 and assigns the verb forms to their respective fields. The application completes the verb entry process by storing the new ID number 133 in verb ID field 124 of step data table 102.

The user completes object entry area 204 by typing in the phrase "the content of". The application stores the content of object entry area 204 in object field 126 of step data table 102.

The user then completes the product entry area 206 by choosing "the draft" product from a user pre-defined listing of available products. The application places product lookup value 163, from product lookup field 162 that corresponds with the chosen product located in product field 164, into product value field 128 in step data table 102.

The user completes Supp Info entry area 208 by typing in the phrase "for consistency." including the final period. The application places the contents of Supp Info entry area 208 in the Supportive Info field 130 of step data table 102.

The user completes performer entry area 210 by typing in the performer name "Editor". The application then searches performer lookup field 144 of performer table 108 to determine if the performer "Editor" already exists. If the performer "Editor" does exist, the application permits the user to proceed to the next entry area. If the performer "Editor" does not exist, the user is prompted to indicate whether the performer name is plural or singular. When the user responds to the prompt, the application creates a new record in performer table 108, assigns a new ID number 133 into performer lookup ID field 142 and assigns the performer and plural true/false values to their respective fields. The application completes the performer entry process by storing performer ID number 133 in performer ID field 120 of step data table 102.

The user then completes compliance entry area 212 by selecting "Requirement" from a pre-defined listing of available compliance levels. The application places a compliance lookup value 147 from compliance lookup field 148 that corresponds with the chosen compliance level, located in compliance level field 150, into compliance value field 122 in step data table 102. The user also selects a step level for the Step Level field 214. This information is stored in the Document Data Table 104 in a Step Level field 107.

At this point, the record in step data table 102 necessary to produce the sentence "The Editor shall check the content of the draft for consistency." is complete. The actual process of concatenating step data table 102 fields to produce this sentence (or variations of it) will be described in the next section.

Syntax Sensitive Concatenation

Concatenation is the combining of elements to form a single element. Syntax-sensitive concatenation is the combining of those elements following a particular set of rules defined by a specific syntax.

When the user completes Step entry screen 200, the application uses the information entered in the Step Level field 214 to determine which concatenation rule to apply to the step data table 102 fields and concatenates the respective data. Each concatenation rule concatenates data differently.

Figure 5A:
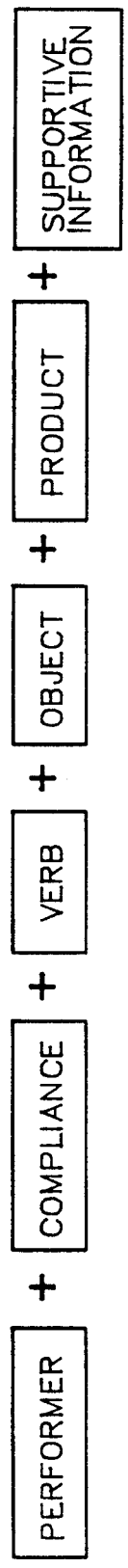
FIG. 5a shows the application of a concatenation rule from a particular syntax to create a sentence from the component parts of speech.
Figure 5B:
FIG. 5b shows the application of this concatenation rule to create a particular sentence as discussed in the text.

FIG. 5a illustrates fields from a generic step data table 102 record. FIG. 5b illustrates how the sample sentence "The Editor shall check the content of the draft for consistency." is parsed into step data table 102 fields shown in FIG. 5a. Application of concatenation rules to this example can produce a variety of different results. Examples of how the basic elements of the record depicted in FIG. 5b can be concatenated in different ways are shown as follows:

| Concatenation Rule | Result |
| --- | --- |
| Heading Level 1 | CHECKING THE CONTENT OF THE DRAFT |
| Heading Level 2 | Checking the content of the draft |
| Descriptive Step | The Editor checks the content of the draft for consistency. |
| QA Manual Step | The Editor shall check the content of |

-continued

| Concatenation Rule | Result |
| --- | --- |
| | the draft for consistency. |
| Procedure Step | Editor: Check the content of the draft for consistency. |

To produce the Heading Level 1 result shown in the table above, the concatenation rule selects only certain fields from a designated step data table 102 record and concatenates those fields according to that rule. For instance, Heading Level 1 concatenation rule only uses the gerund form of the verb, the direct object and the product, then concatenates those elements, all in capital letters and with no trailing period. Similarly, Heading Level 2 concatenation rule uses the same fields as Heading Level 1, but only capitalizes the initial letter of the first word. By contrast, the QA Manual Step concatenation rule produces a result which uses all of the elements represented as shown in FIG. 5b, and the result is imperative in nature by virtue of the compliance level "Requirement" which signals the application to insert the word "shall" in the text between the performer "Editor" and the verb "check". The "requirement" compliance level was entered in the system by the user when the step data table was created and was stored in the compliance field 122. The Descriptive Step concatenation rule uses the performer, the third-person singular form of the verb (infinitive if the performer is plural except for verb "be" which is replaced with "are"), the direct object, the product, and the supportive information. The procedure step concatenation rule uses the performer, the infinitive verb, the direct object, and product, and the supportive information.

Five concatenation rules are represented in the table above. However, different ordering and selection of the basic elements, and treatments, such as bolding, underlining or addition of left and right bracket characters "[]" can be specified in a concatenation rule to produce, for instance, a new heading rule for a different level that might appear like this:

[[Draft Checks]]

Building a Syntax

Referring now to FIG. 6. To build a syntax, the user completes Syntax Table 604 and Concatenation Rule Table 602. First, the user defines a syntax name 603 in Syntax Table 604. Then, for that syntax name, the user completes the concatenation rules table 602 to specify a concatenation rule to apply to each step level (e.g., 1st-Level heading, 2nd-level heading, action step) of a document.

Suppose the user wants to create a syntax called "Procedure". The user would enter "Procedure" in syntax name 603. The user would then assign a concatenation rule for each step level that would be encountered in a Procedure syntax document. If the application defines five step levels (e.g., 1st-level heading, 2nd level heading, 3rd level heading, action step, and action sub-step), then five concatenation rules must be specified. To specify a concatenation rule for 1st level headings in the Procedure syntax, the user types "Procedure" in syntax name field 606, then "Heading level 1" in Step Level field 608, then an integer in syntax rule number field 610. This process is then repeated for the four other step levels.

The value of the integer entered in syntax rule number field 610 corresponds to a concatenation rule stored in computer code by the application. The user can choose from the list of concatenation rules programmed into the system by the system developer. A different integer value calls a different concatenation rule. The current preferred embodiment offers eleven possible concatenation rules, although many more are possible. When a concatenation rule is called, the rule arranges the elements of the current record of step data table 102.

Structured Document Syntax Control

Referring now back to FIG. 1, document data table 104 represents a document of some type for which a syntax name is entered in the syntax name field 109. For instance, a jet engine overhaul procedures manual may use the "Procedure" syntax name so the content of the document conforms to a required form of presentation. Once the user selects a syntax name, he creates a hierarchical list of steps in the step fields 105 by selecting steps which have been entered in step data table 102. The user then associates with each step the level of heading or action step desired in step type field 107. When the document represented by the document data table 104 is sent to an output device (e.g., printer, monitor), the appropriate concatenation rules defined for the syntax specified in the syntax name field 109 are applied to each step level in the document. For example, step data table 102 records relating to a jet engine mechanic's maintenance duties may be used in a jet engine maintenance procedures manual (with a defined syntax) to produce the following section in the manual:

OVERHAULING A FUEL PUMP
  Mechanic
    Remove the fuel pump from the engine.
  Supervisor
    Inspect the fuel pump rotor monthly for wear.
  Mechanic
    If the fuel pump rotor is worn, then replace the rotor.

By applying a different syntax to the same list of steps in a document data table, the document can be converted to a new use. For example, the procedures manual above may be converted into a quality assurance manual for jet engine maintenance procedures. The section of the procedure manual shown in the example above would then appear as follows:

HOW TO OVERHAUL A FUEL PUMP
  The mechanic shall remove the fuel pump from the engine.
  The supervisor should inspect the fuel pump rotor monthly for wear.
  If the fuel pump rotor is worn, then the mechanic shall replace the rotor.

Although a specific embodiment of the invention has been disclosed, it will be understood by those having skill in the art that changes can be made to the embodiment without departing from the spirit and scope of the invention. The example above shows the use of an "if"—"then" construction. The system can be designed with an additional field in the step data table 102 for a word indicating condition (e.g. if or when) and each concatenation rule can specify whether to use the word "then" when assembling the sentence and whether to put the "if" clause at the beginning of the sentence or at the end.

Also, the verb table could include many more possibilities for additional forms of each verb. Many foreign languages, particularly European languages, in which the invention might be implemented, would require such additional verb forms. For English, first and second-person, both singular and plural, verb forms may be added for use in creating documents which require these forms.

We claim:

1. A structured document system comprising:
   (a) words memory means for storing a plurality of sets of words, each set including at least two different parts of speech;
   (b) rules memory means for storing a plurality of concatenation rules, each of which specifies how a set of words shall be assembled to produce a message; and
   (c) logic means for assembling a plurality of messages, each message assembled from one of the sets of words according to one of the concatenation rules.

2. The device of claim 1 in which the words memory means further comprises means for storing alternative forms of each stored verb, one of which alternative forms may be selected by the logic means according to each concatenation rule.

3. The device of claim 1 further comprising syntax memory means for storing a list of step levels and, for each step level, an associated concatenation rule specified for that step level to be applied to any set of words.

4. The device of claim 1 in which the words memory means further comprises means for storing alternative forms of each stored verb which alternative forms may be selected by the logic means according to subject-verb agreement.

5. The device of claim 1 in which the words memory means further comprises means for storing for each stored subject whether the subject is singular or plural.

6. The device of claim 1 in which the words memory means further comprises means for storing for a stored noun alternative forms of the noun consisting of one or more of: singular and plural, possessive, and use with definite and indefinite articles.

7. The device of claim 1 in which each set of words includes an indication specifying whether, upon assemblage into a message according to a concatenation rule, the message shall be a message stating a requirement, a recommendation, or an option.

8. The device of claim 1 in which the words memory means further comprises means for storing for a stored noun alternative forms of the noun consisting of one or more of: possessive, and use with definite and indefinite articles.

* * * * *